June 16, 1953        L. T. GASINK        2,641,810
PLURAL CABLE CLAMP
Filed March 14, 1949        2 Sheets—Sheet 1
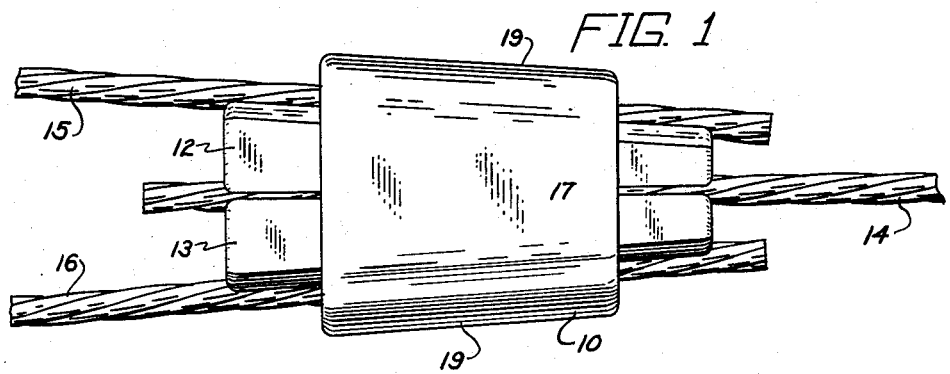
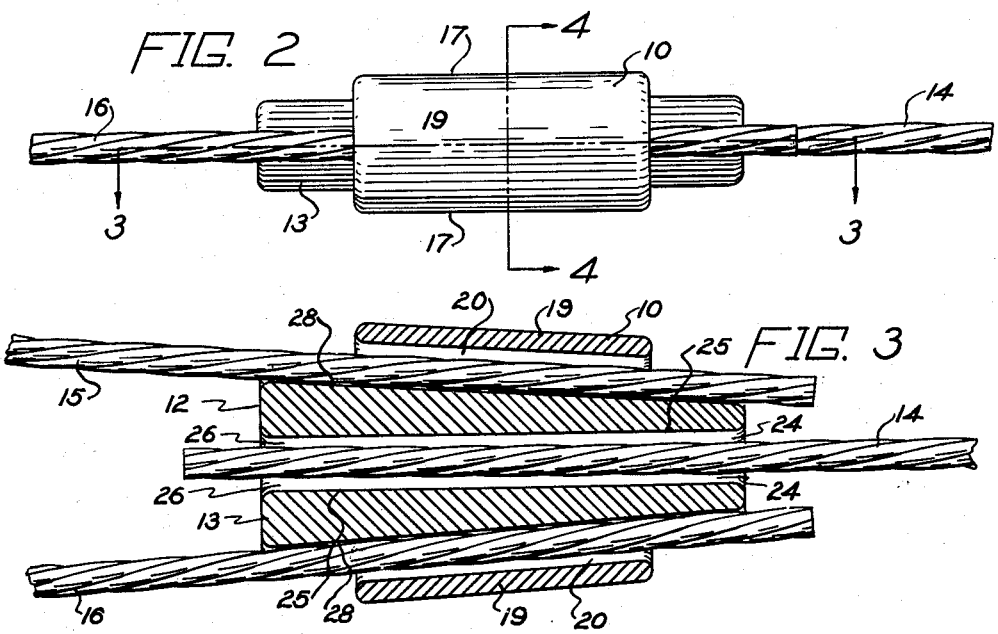
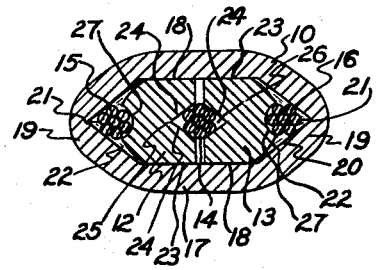
INVENTOR
LEWIS T. GASINK
BY *G. H. Braddock*
ATTORNEY June 16, 1953 L. T. GASINK 2,641,810
PLURAL CABLE CLAMP
Filed March 14, 1949 2 Sheets-Sheet 2
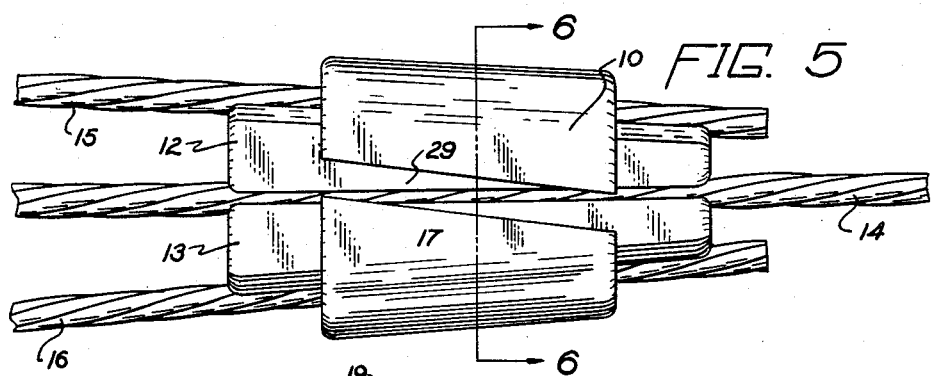
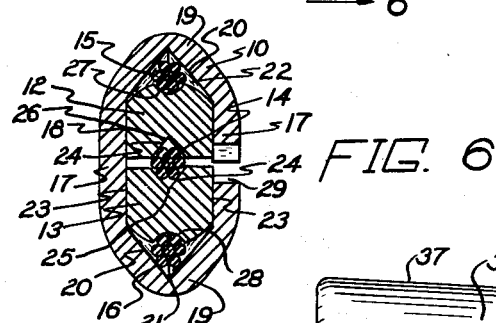
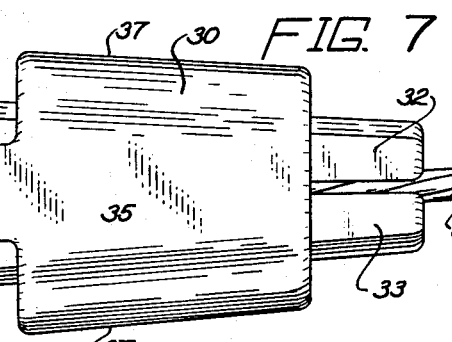
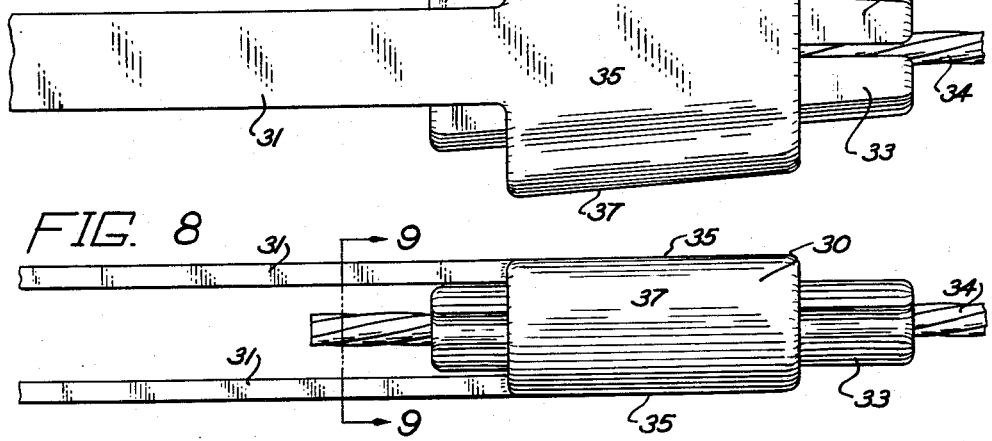
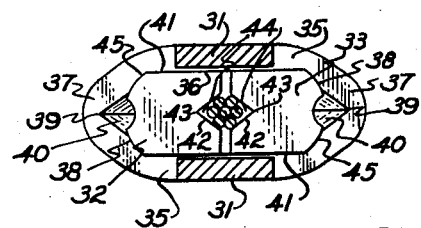
INVENTOR
LEWIS T. GASINK
BY G. H. Braddock
ATTORNEY Patented June 16, 1953

2,641,810

UNITED STATES PATENT OFFICE 2,641,810

PLURAL CABLE CLAMP

Lewis T. Gasink, Rose Township, Ramsey County, Minn., assignor to American Hoist & Derrick Co., St. Paul, Minn., a corporation of Delaware Application March 14, 1949, Serial No. 81,308

2 Claims. (Cl. 24—126)

This invention has relation to a clamp adapted to be used for various purposes, such, for example, as to connect a cable or guy line to the free end portions of cables supported by an anchoring element, or to connect a cable or guy line to an anchored fixture.

Speaking generally, the new and improved clamp consists of an open ended hollow body of tapered configuration constituted as a frame of the clamp and tapered wedges slidable in said hollow body or frame to be capable of functioning, in cooperation with the hollow body or frame, to cause one or more cables to be secured in and to the clamp. In practical operation, the clamp herein presented ordinarily will be employed to connect a guy line with a plurality of anchored cables, or with an anchored fixture, in such manner as to cause the guy line to be held in stretched condition.

The object of the invention is to provide a clamp of the general type as stated wherein will be incorporated desirable, novel and improved features and characteristics of construction.

In the accompanying drawings forming a part of this specification,

Fig. 1 is a side elevational view of a clamp made according to the invention as when applied to use to connect a first cable or guy line with second and third cables;

Fig. 2 is an edge elevational view of the disclosure as in Fig. 1;

Fig. 3 is a longitudinal sectional view, taken on line 3—3 in Fig. 2;

Fig. 4 is a transverse sectional view, taken on line 4—4 in Fig. 2;

Fig. 5 is a side elevational view of a clamp of modified construction incorporating the features and characteristics of the invention;

Fig. 6 is a transverse sectional view, taken on line 6—6 in Fig. 5;

Fig. 7 is a side elevational view of a clamp of further modified construction made according to the invention as when applied to connect a cable or guy line with an anchored fixture;

Fig. 8 is an edge elevational view of the disclosure as in Fig. 7; and

Fig. 9 is a transverse sectional view, taken on line 9—9 in Fig. 8.

With respect to Figs. 1 to 4 of the drawings and the numerals of reference thereon, an open ended hollow body 10 constitutes a frame of the clamp, and tapered wedges, denoted 12 and 13, respectively, of said clamp are slidable in said hollow body or frame to be capable of functioning, in cooperation with the hollow body or frame, to cause an inferior cable 14 and exterior cables, indicated 15 and 16, respectively, to be secured in and to the clamp. The interior cable 14 may, for instance, be an anchored guy line and the exterior cables 15 and 16 themselves also anchored and connected with the interior cable or guy line 14 by means of the clamp in such manner as to cause said interior cable or guy line to be retained in stretched condition.

The hollow body or frame 10 is of metal, and, in the disclosure as made, opposite side walls 17, 17 of said hollow body or frame are in parallel relation and bound or define spaced apart, parallel surfaces 18, 18 at the interior of the hollow body or frame in opposed or facing relation to each other. The spaced apart, parallel surfaces 18, 18 are in alined relation in the direction of the thickness of said hollow body or frame, and each of said spaced apart, parallel surfaces 18, 18 is of tapering configuration in direction longitudinally of the clamp.

Opposite edge walls 19, 19 of the hollow body or frame 10 are in converging relation in direction longitudinally of said clamp, and said opposite edge walls are between and contiguous with adjacent side edges of the opposite side walls 17, 17, respectively. Each edge wall 19 bounds or defines a pair of gripping surfaces, indicated 20, 20, at the interior of said hollow body or frame which converge in the direction of the thickness of the hollow body or frame and meet at a vertex 21. In the instance of each edge wall 19 the converging gripping surfaces 20, 20 together provide a V-shape recess 22 adapted to receive a part of one of the exterior cables, 15 or 16, as the case may be. Said converging gripping surfaces 20, 20 provided by each edge wall 19 are between the spaced apart, parallel surfaces 18, 18, respectively, the side edges of the converging gripping surfaces spaced from the vertices 21 are contiguous with adjacent side edges of said spaced apart, parallel surfaces 18, 18 and the V-shape recesses 22, 22 are in alined relation in the direction of the width of the hollow body or frame 10. And too, the bounding or defining surfaces of the V-shape recesses 22, respectively, converge in direction longitudinally of said hollow body or frame.

Each tapered wedge also is of metal, and the tapered wedges desirably can be of duplicate construction. Each tapered wedge is of dimension in the direction of the thickness of the hollow body or frame 10 substantially to span the distance between the spaced apart, parallel surfaces 18, 18 and the tapered wedges include opposite parallel surfaces 23, 23 freely slidable over said spaced apart, parallel surfaces 18, 18. Each tapered wedge is of dimension in the direction of the width of said hollow body or frame such that the tapered wedges can be adjusted longitudinally in the hollow body or frame selectively to cause the interior and exterior cables to be gripped or released.

Each tapered wedge bounds or defines a pair of gripping surfaces, represented 24, 24, at the interior of the corresponding tapered wedge, between the parallel surfaces 23, 23, which converge in the direction of the thickness of the hollow body or frame and meet at a vertex 25. In the instance of each wedge the converging gripping surfaces 24, 24 together provide a V-shape recess 26 adapted to receive a part of the interior cable 14. The converging gripping surfaces 24, 24 provided by the tapered wedges, respectively, are in opposed or facing relation, the V-shape recesses 26, 26 are in alined relation with the V-shape recesses 22, 22 in the direction of the width of said hollow body or frame and so related as to be capable of together receiving and surrounding said interior cable 14, and the bounding or defining surfaces of said V-shape recesses 26, 26, respectively, are adapted to lie in parallel relation to each other when in gripping relation to the interior cable.

Each tapered wedge bounds or defines a slipping surface 27 at the exterior of the corresponding tapered wedge, between the parallel surfaces 23, 23. As shown, each slipping surface 27 provides a C-shape recess 28 adapted to receive a part of one of the exterior cables, 15 or 16, as the case may be. The C-shape recesses 28, 28 are in alined and contiguous relation with the V-shape recesses 22, 22 in the direction of the width of the hollow body or frame 10, the bounding or defining surfaces of said C-shape recesses, respectively, converge in direction longitudinally of said hollow body or frame, and the bounding or defining surface of each C-shape recess is adapted to lie in parallel relation to the bounding or defining surface of the V-shape recess in the edge wall 19 at the corresponding side of the hollow body or frame when said hollow body or frame and the tapered wedges are in gripping relation to exterior cables.

The clamp disclosed in Figs. 5 and 6 is of the same construction as the clamp of Figs. 1 to 4, except that in said Figs. 5 and 6 one of the side walls 17 of the hollow body or frame 10 includes an oblique, longitudinally extending slot 29 for ready and easy insertion and removal of the interior cable 14. Elements of Figs. 5 and 6 which correspond with the same or equivalent elements in Figs. 1 to 4 are identified by the same reference numerals.

Referring to Figs. 7 to 9, an open ended hollow body 30, constituting a frame of the clamp, is integral or rigid with spaced apart strips 31, 31 which may be part of a supporting fixture (not shown) for said clamp, and tapered wedges, denoted 32 and 33, respectively, of the clamp are slidable in said hollow body or frame to be capable of functioning to cause an interior cable 34 to be secured in and to the clamp.

The hollow body or frame 30 is of metal and may be a substantial duplicate of the hollow body or frame 10, including opposite side walls 35, 35, (equivalent to and for the same purpose as the opposite side walls 17, 17), parallel surfaces 36, 36, (equivalent to and for the same purpose as the parallel surfaces 18, 18), opposite edge walls 37, 37, (equivalent to and for the same purpose as the opposite edge walls 19, 19), and surfaces 38, 38 meeting in vertices 39, (equivalent to the gripping surfaces 20, 20 which meet in the vertices 21). V-shape recesses 40, 40 are equivalent to and for the same general purpose as the V-shape recesses 22, 22.

Each tapered wedges 32, 33 also is of metal, and the tapered wedges 32, 33 are for the same general purpose as the tapered wedges 12, 13. Each tapered wedge 32, 33 includes opposite parallel surfaces 41, 41, (equivalent to and for the same purpose as the parallel surfaces 23, 23), and bounds or defines a pair of gripping surfaces 42, 42 at the interior of the corresponding tapered wedge and meeting in a vertex 43, (equivalent to the gripping surfaces 24, 24 meeting the vertices 25). V-shape recesses 44, 44 are equivalent to and for the same purpose as the V-shape recesses 26, 26.

Each tapered wedge 32, 33 bounds or defines a slipping surface or slipping surfaces 45 at the exterior of the corresponding tapered wedge, between the parallel surfaces 41, 41. The slipping surfaces 45, 45 converge in direction longitudinally of the hollow body or frame 30, and each slipping surface 45 is adapted to lie in engaged, parallel relation to the bounding or defining surface of the V-shape recess 40 at the corresponding side of said hollow body or frame 30 when the tapered wedges 32 and 33 are in gripping relation to the interior cable 34.

Clamps of the general character as herein illustrated and described are neither broadly new nor entirely efficient when put to various uses. In some instances, the clamps have not been successful because of inability to rigidly grip cables, and in other instances, when fit to grasp cables, the clamps have caused the cables to be damaged.

The clamp of the present invention incorporates features and characteristics adapted to render it capable of rigidly gripping a cable or cables, and, at the same time, incapable of causing a gripped cable, or gripped cables, to be damaged. With this end in view, and speaking generally, the new and improved clamp is constructed to provide both cable gripping surfaces of or upon metal or material of said clamp sufficiently soft to be bitten into or penetrated by a cable or cables when grasped in the clamp and slipping surfaces of or upon metal or material of said clamp sufficiently hard to be slidable relative to cables to be gripped in the clamp, or relative to elements or members of said clamp against which said slipping surfaces are adapted to be engaged.

The hollow body or frame 10 of the clamp of Figs. 1 to 4 and Figs. 5 and 6 desirably can be composed of metal, and the portions of said hollow body or frame which provide the gripping surfaces 20, 20 bounding or defining the V-shape recesses 22, 22 will be of metal or material softer than that of exterior cables, such as 15 and 16, intended to be grasped in the clamp.

Also, each of the tapered wedges 12 and 13 of said Figs. 1 to 4 and Figs. 5 and 6 desirably can be composed of metal, and the portions of said tapered wedges which provide the gripping surfaces 24, 24 bounding or defining the V-shape recesses 26, 26 will be of metal or material softer than that of an interior cable, such as 14, intended to be grasped in the clamp.

The portions of the tapered wedges 12 and 13 which provide the slipping surfaces 27, 27 will be of metal or material harder than that of exterior cables, such as 15 or 16, intended to be grasped in the clamp.

The hollow body or frame 30 of the clamp of Figs. 7 to 9 can be composed of metal or material of any preferred hardness.

The tapered wedges 32 and 33 of said Figs. 7 to 9 desirably can be composed of metal, and the portions of said tapered wedges which provide the gripping surfaces 42, 42 bounding or defining the V-shape recesses 44, 44 will be of metal or material softer than that of an interior cable, such as 34, intended to be grasped in the clamp.

The portions of the tapered wedges 32 and 33 which provide the slipping surfaces 45, 45 will be of metal or material sufficiently hard to be freely slidable over the surfaces 38, 38.

It may be desirable, for minimum manufacturing cost and satisfactory operation, that the hollow body or frame and each tapered wedge be constructed of comparatively soft material and the portions of the tapered wedges for providing the slipping surfaces be case hardened. The gripping surfaces could be of varying configuration, but gripping surfaces as disclosed, bounding or defining V-shape recesses, have been found to function quite satisfactorily. Also, the slipping surfaces could be of configuration other than disclosed, but C-shape slipping surfaces are efficient in the accomplishment of their intended service. The metal of the clamp providing the gripping surfaces is indented by the cables, rather than the cables being indented by elements of the clamp, as has frequently heretofore been the case.

In the interest of long usage of the clamps they can be galvanized. It has been determined that galvanizing has no noticeable deterring effect. On the contrary, galvanizing increases the frictional characteristics of the gripping surfaces.

By way of example, the hollow body or frame of the clamp can be a forging, the tapered wedges can each be forgings having portions thereof case hardened to provide the slipping surfaces of said clamp, and the cables employed can be of the copperweld type.

The cables will become tightly gripped when the tapered wedges are forced home in the hollow body or frame, and, when the cables are gripped, the clamp will be self-tightening in response to effort tending to move the interior cable, or the exterior cables, in direction away from said clamp. Cables become elongated and reduced in cross-section under heavy load. Obviously, tendency toward elongation will cause the cables to be more tightly gripped and confined in the clamp.

It is evident that there will be four different and cooperating longitudinally extending gripping surfaces in contact with the interior cable, and a pair of different and cooperating longitudinally extending gripping surfaces in contact with each exterior cable. The relatively soft metal providing the gripping surfaces bounding or defining the V-recesses will permit the strands of the cables to become imbedded into elements of the clamp. Thus there will be distributed grip upon the individual strands, and a minimum of cable abrasion.

Obviously, the operation of the clamp is a function of a difference in friction on the wedge surfaces. That is, the self-tightening action of the clamp is dependent upon the difference in friction at the gripping and slipping sides of the wedges.

What is claimed is:

1. A self-tightening clamp comprising a body having an opening extending longitudinally therethrough bounded by spaced, oppositely disposed side walls and spaced, converging, oppositely disposed end walls of said body, wedges tapered in direction longitudinally thereof mounted in said opening between said converging, oppositely disposed end walls in the plane thereof and in engaged relation with said oppositely disposed side walls for slidable movement thereover in direction longitudinally of said body, slipping surfaces upon exterior portions of said wedges adjacent said converging, oppositely disposed end walls, respectively, movable toward each other in response to sliding movement of the wedges toward a smaller end of said opening, first parallel, elongated V-shape gripping surfaces upon material of said wedges sufficiently soft to be indented by an interior cable to be retained in said clamp disposed interiorly of the wedges in alined relation therewith to be grasped against elongated portions of opposed surfaces of said interior cable in response to forcible sliding movement of said wedges toward said smaller end of said opening, and second elongated V-shape gripping surfaces upon material of said body sufficiently soft to be idented by exterior cables to be retained in the clamp disposed interiorly of the body in alined relation with said wedges to be grasped against elongated portions of exterior surfaces of said exterior cables with sliding movement of said slipping surfaces over interior surfaces of the exterior cables in response to forcible sliding movement of said wedges toward the smaller end of said opening.

2. The combination as specified in claim 1 wherein each of said slipping surfaces is of C-shape.

LEWIS T. GASINK.

References Cited in the file of this patent

UNITED STATES PATENTS

| Number | Name | Date |
|---|---|---|
| 1,644,376 | Haworth | Oct. 4, 1927 |
| 1,814,933 | Keen | July 14, 1931 |
| 2,017,887 | Blackburn | Oct. 22, 1935 |
| 2,043,463 | Bullum | June 9, 1936 |
| 2,180,866 | Cryer | Nov. 21, 1939 |
| 2,294,398 | Ferguson | Sept. 1, 1942 |
| 2,348,608 | Cleverly | May 9, 1944 |

FOREIGN PATENTS

| Number | Country | Date |
|---|---|---|
| 35,543 | Germany | May 10, 1886 |
| 21,539 | Sweden | July 6, 1905 |